(12) United States Patent
Hintz

(10) Patent No.: US 7,991,722 B1
(45) Date of Patent: Aug. 2, 2011

(54) INFORMATION REQUEST GENERATOR

(75) Inventor: Kenneth J Hintz, Fairfax Station, VA (US)

(73) Assignee: George Mason Intellectual Properties, Inc., Fairfax, VA (US)

( * ) Notice: Subject to any disclaimer, the term of this patent is extended or adjusted under 35 U.S.C. 154(b) by 863 days.

(21) Appl. No.: 11/735,188

(22) Filed: Apr. 13, 2007

Related U.S. Application Data

(60) Provisional application No. 60/744,867, filed on Apr. 14, 2006.

(51) Int. Cl.
*G06F 17/00* (2006.01)
*G06F 17/10* (2006.01)
*G06F 17/30* (2006.01)

(52) U.S. Cl. ............. 706/45; 706/26; 706/27; 706/22; 706/21; 707/771; 707/778

(58) Field of Classification Search ............. 706/45
See application file for complete search history.

(56) References Cited

OTHER PUBLICATIONS

Hintz et al., "Dynamic goal instantiation in goal lattices for sensor management", Apr. 2005.*
Schaefer et al., "Sensor Management in a Sensor Rich Environment", 2000.*
Pearl, "Bayesian Networks:A Model of Self-Activated Memory for Evidential Reasoning", 1985.*
Kreucher et al., "Information Based Sensor Management for Multitarget Tracking", 2003.*
K. Hintz Publications, Latest update: Apr. 9, 2009.*

* cited by examiner

*Primary Examiner* — David R Vincent
*Assistant Examiner* — Nathan H Brown, Jr.
(74) *Attorney, Agent, or Firm* — David Grossman

(57) ABSTRACT

A sensor manager comprising: a situation information expected value network and an information instantiator. The situation information expected value network includes a probabilistic network configured to generate situation probabilities using situation data; and an expected information gain determination module configured to generate an information request using expected changes in the situation probabilities. The information instantiator is configured to generate a sensor observation request utilizing the information request and the situation data. The situation data includes at least one of the following: a goal lattice structure data; a goal lattice value; a kinematic state estimate; a non-kinematic state estimate; a search probability mass function; a sensor applicable function table; or any combination of the above. The probabilistic network includes: at least one managed evidence node; at least one unmanaged evidence node; and at least one situation evidence node.

18 Claims, 9 Drawing Sheets

INFORMATION REQUEST GENERATOR

CROSS-REFERENCE TO RELATED APPLICATIONS

This application claims the benefit of U.S. Provisional Application No. 60/744,867, filed Apr. 14, 2006, entitled "Information Request Generator," which is hereby incorporated by reference in its entirety.

DETAILED DESCRIPTION OF EMBODIMENTS

Embodiments of the present invention may be used to determine which sensor functions available in a heterogeneous sensor system are likely to yield the most useful data in response to a high level information request. The expectation of the valued situation information is disclosed as a measure which may be used to determine which information to obtain with a heterogeneous sensor system in a statistically non-stationary, dynamic environment. Situation information is preferably based on the change in the total Kullback-Leibler divergence of a particular type of probabilistic network called an influence diagram the combination of which is referred to in this document as a situation information expected value network (SIEV-Net). The SIEV Net weights situation chance nodes by their dynamic mission goal values as expressed in the topmost goals of a mission goal lattice and computes the expected valued information which is expected to result if a particular information request is selected. The sensor information request which yields the largest valued expected information may then be instantiated. This should result in the greatest reduction in valued uncertainty of a situation estimate while constrained to maximize the mission value of the information obtained and constrained to use the available sensor functions.

Figure 1:
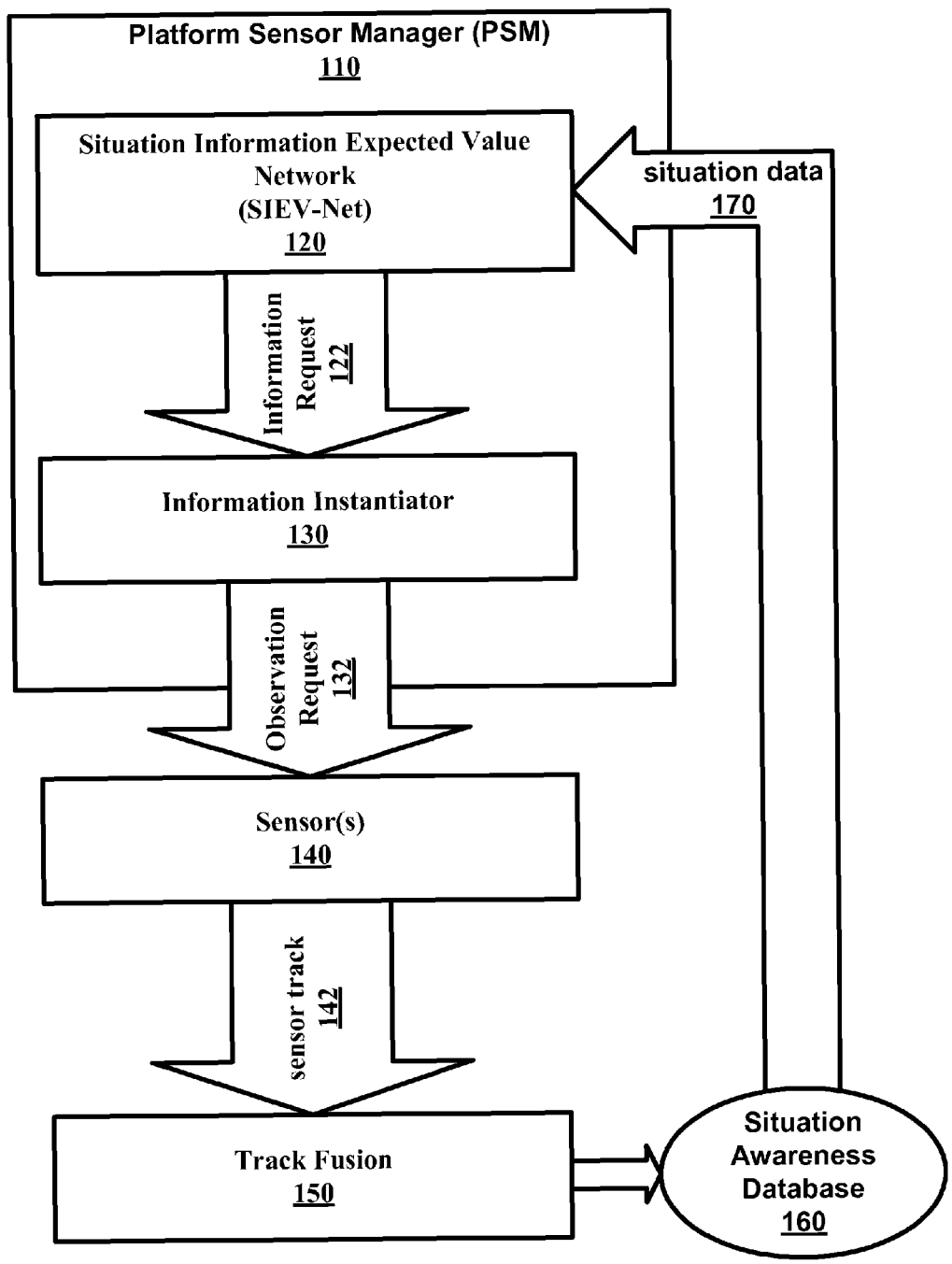
FIG. 1 is a diagram showing the partial data flow in a Sensor Management System as per an aspect of an embodiment of the present invention.
Figure 2:
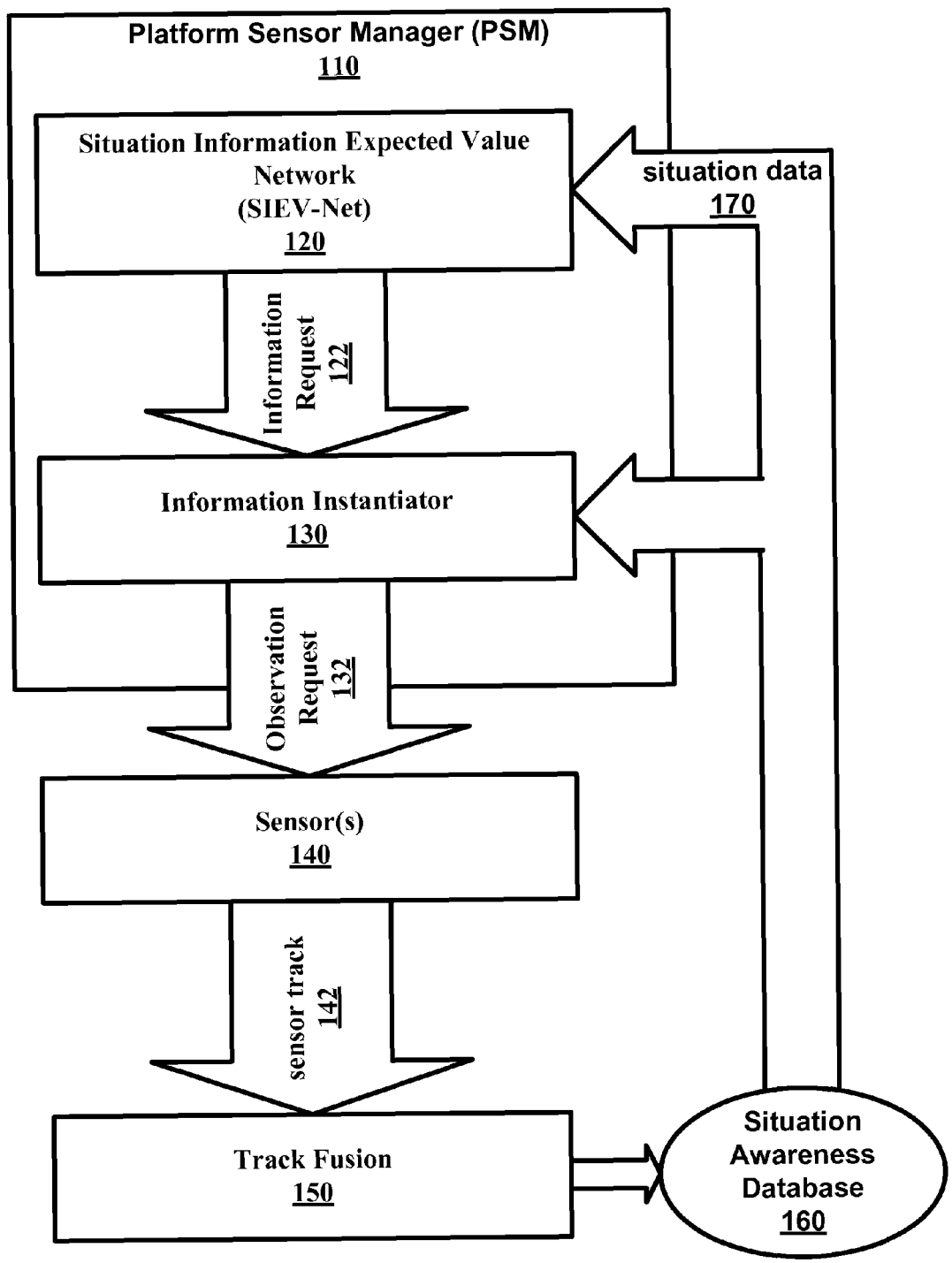
FIG. 2 is a diagram showing the partial data flow in a Sensor Management System as per an aspect of an alternative embodiment of the present invention.
Figure 3:
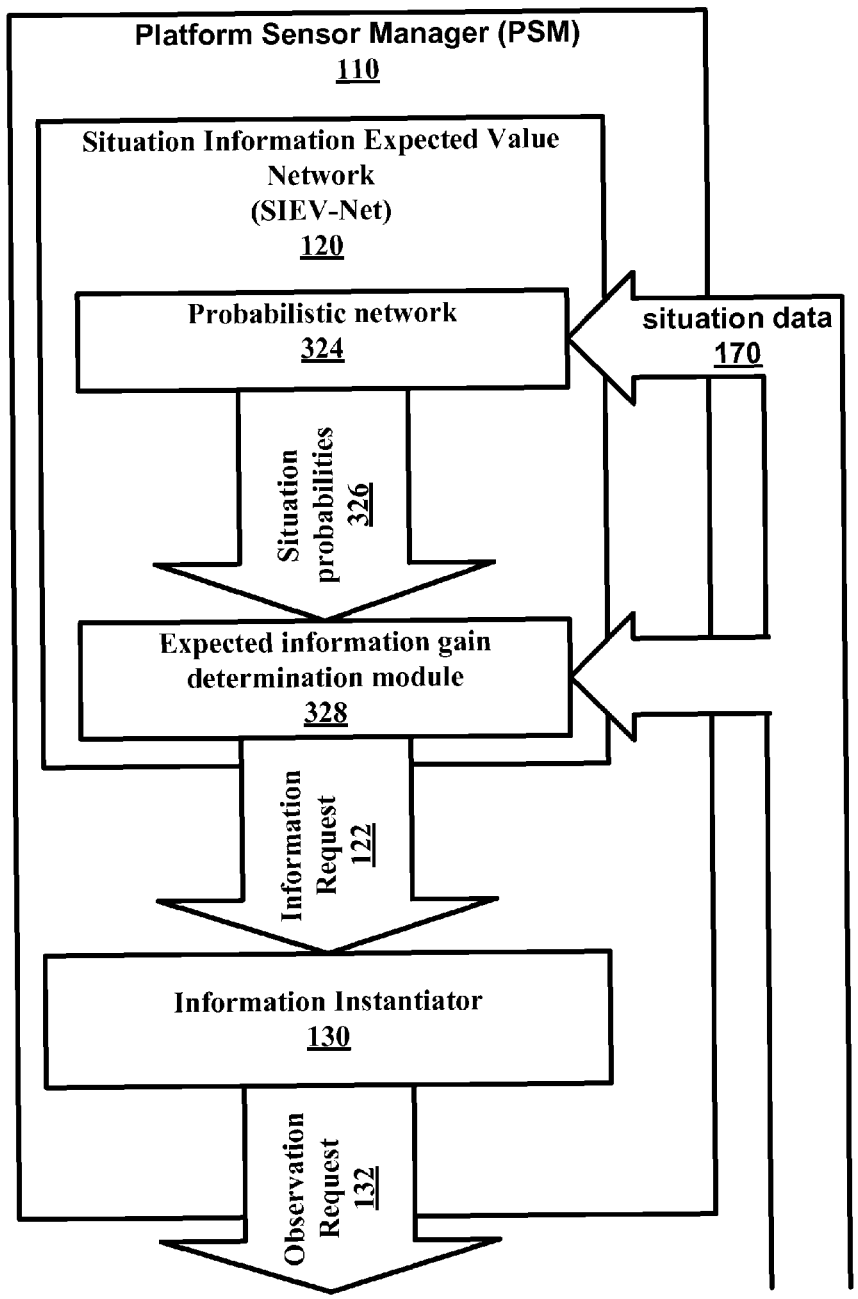
FIG. 3 is a diagram of a Situation Information Expected Value Network as per an aspect of an embodiment of the present invention.

A purpose of the platform sensor manager (PSM) 110 in the sensor management model, briefly shown in FIG. 1, FIG. 2, and FIG. 3, is to coordinate the use of heterogeneous sensor resources in order to decrease the uncertainty associated with its perceived world model while at the same time maximizing the accomplishment of the mission goals. The first work [1] on this approach focused on utilizing information theoretic means for quantifying the change in kinematic state uncertainty as entropy changes and used this measure for choosing among alternative sensor measurement actions. Though necessary, this approach is not necessarily sufficient since it does not take into account the competing mission requirements for knowledge of the environment or other types of situation information. The concept of goal lattices [2] was developed to address the competitive nature of the knowledge needs [3] from a mission point of view. The goal lattice provides a quantifiable means of determining the contribution of sensor actions to predefined but dynamic mission goals, thus allowing one to perform a tradeoff analysis among different sensor actions within the mission context. The pre-mission, static goal lattice [3] assigns values to sensor functions for the general tasks of search, track, and ID. An extension of this goal lattice model [4] provides finer grained control of the apportionment among these three sensor tasks by allowing differentiation of the contributions of tracking and identifying particular targets and searching specific areas. These fine grained controls, referred to as dynamic goals, represent specific temporal information needs not schedulable a priori. This improved goal lattice model provides a construct for instantiating a dynamic goal, also referred to as an information request, within the static lattice structure.

The addition of dynamic goals allows one to compute what we call the expected sensor information value rate [4] or more briefly, the expected information value rate (EIVR) of a sensor, which may be defined as the product of 1) the value of the information to the mission, 2) the amount of information gained by the sensor action, and, 3) the probability of obtaining the desired information by the sensor action, with this product divided by the time it is anticipated to take to acquire that information. The computation of the EIVR in the information instantiator 116 provides a relative value which is passed to the sensors 120 as part of an observation request 118 in order to allow them to prioritize the observation requests and their assignment to sensors in the sensor scheduler. The net result of this should be a maximization of the specific "valued information" which can be obtained by a sensor 120 and hence, the most valuable reduction in the uncertainty about the situation while taking into account the detailed scheduling of a sensor 120.

Embodiments of the present invention extend the sensor management system platform sensor manager paradigm by providing a means for selecting the appropriate dynamic goals to instantiate at a particular instant in a particular environment. Dynamic goals represent specific information needs that derive not only from the topmost mission goals but from the dynamic situation within which the sensors finds itself. Both the amount of situation information and the value of that information, in terms of their contribution to the accomplishment of the mission goals, can change as the situation evolves. As a simple example, the value of knowing the location of a particular hostile target changes as its course changes from in-bound to out-bound. A familiar construct, that of influence diagrams, is disclosed herein to model the uncertainty of the situation as it changes, along with the concepts of situation information expected value, and expected information value rate. These are disclosed as means of quantifying the effects of sensor functions as they result in a change in the valued uncertainty associated with a situation assessment.

Embodiments lean towards real-time solutions to the sensor management problem and hence, do not seek the single, optimal solution, but rather a readily computable and realizable effective sensor management strategy. The example context of this disclosure in discussing sensor management, even though it is more generally applicable, is that of forward air defense (FAD) and control of the sensors of a fighter aircraft. The approach can be briefly summarized as partitioning the problem into a series of smaller optimization problems based on imperfect, but reasonable, approximations of the capabilities of the other components of the sensor management system. Embodiments of this invention address the selection of what information to request.

Valued Situation Information

The concept of uncertainty is inherent in the $C^4I$ (Command, Control, Communications, Computers and Intelligence) domain [5] as it involves the interrelationship of many difficult to quantify variables including an enemy's intent. Performing situation and threat assessment within this domain may require probabilistic modeling which is capable of considering a set of environmental factors and their associated uncertainty. The assessment of these uncertainties can continue as more information about the environment is obtained, primarily from real time organic and collaborating sensors and the merging of this information with a priori intelligence estimates about the situation. As more information is obtained, the uncertainty regarding the possibilities should reduce and the number of potential courses of action of the adversary should decrease. The effect of obtaining a particular amount of information relevant to the situation can be measured by calculating the change in entropy (uncertainty) from before to after the information is obtained as represented by the Kullback-Leibler divergence. As with kinematic [1] (change in state error covariance matrix), search (change in search probability mass function), and ID [6] (change in uncertainty about identity of adversary) information, situation information may be defined based on a change in the entropy of the random variables characterizing a situation. This gain in information may reduce the uncertainty about the given situation and give a quantifiable measure of the effects of obtaining information on a perception of the actual situation. This particular formalism is based on entropy changes in an influence diagram formulation of situation conditional probability density functions. Embodiments may choose which dynamic goal (information request) to instantiate based on the expected gain in information if we were to request that information.

Situation information offers a convenient methodology with which to evaluate different dynamic goals and to determine which will most reduce the uncertainty in the PSM's perception of the situation. At a particular instant, the effect (in terms of valued situation information gain) of instantiating each of the dynamic goals one at a time can be computed and evaluated relative to each other in a manner similar to the normal use of an influence diagram. The platform sensor manager can then determine which dynamic goal will most reduce the uncertainty regarding the perceived situation, and subsequently instantiate that dynamic goal. Thus, situation information can provide a quantifiable, readily computable means for effectively determining which information to request next. Note that embodiments of the present invention distinguishes between information requests and the specific sensor which will obtain that information through the execution of an observation request.

Influence Diagram Related Situation Model

Bayesian Networks

Bayesian networks can provide a construct for modeling and reasoning about uncertainty. [7,8]. Bayesian networks, also known as belief networks and probabilistic causal networks, are directed acyclic graphs (DAG) where the nodes represent the probability distributions of random variables and certain independence assumptions hold [8]. There is only one type of node and this is called a chance node or nature node which is a discrete or continuous probability mass function (PMF) associated with a random variable. The directed arcs connecting these chance nodes can indicate causality between the events. This means that root nodes, those without any arcs entering them, are just PMFs. Nodes which have an arrow entering them are conditional PMFs with the PMFs' particular values being dependent on the values of the chance nodes at the origins of these entering arcs. The acquisition of some evidence in the form of a change in uncertainty about the occurrence or state of an event as expressed by a change in the PMF associated with a node is generally referred to as obtaining information. Because of the conditional relationship among the nodes one can apply Bayes theorem in either a forward or reverse direction to compute the changes in the other, causing or caused, nodes' PMFs. Another way to say this is that probabilistic inference can be used to find beliefs for all the variables as a result of the change in the evidence, also called a finding, in one node. It is important to note that in a normal Bayesian network there are only chance nodes, that the term information is used loosely to mean the acquisition of evidence, and that there is no inherent concept of the value of the information obtained by the accrual of evidence.

According to Jensen [7], a Bayesian network contains: a set of random variables expressed as chance nodes; a finite set of mutually exclusive states for each variable; and a directed acyclic graph (DAG) with a node corresponding to each variable.

Nodes within a Bayesian network can represent different types of random variables. Context variables, also known as non-managed nodes, may provide the information about the circumstances and environment that the network will be operating in. Hypotheses variables, also known as situation nodes, may be the non-observable variables of interest. Information (or sensor) variables, also known as managed nodes, can represent the observable variables within the situation that provide evidence concerning the hypothesis variables. Bayes rule is used to compute changes in the uncertainties of the hypothesis variables given the evidence accrued by the information variables.

Bayesian networks have been used in many domains, including situation assessment in the $C^4I$ domain. They may be used as a tool to provide decision makers an automated means of processing a large amount of data into a concise set of uncertainties regarding a given situation as well as showing their causal and mathematical interaction.

Influence Diagrams

An influence diagram [9], on the other hand, is a Bayesian network extended with two additional types of nodes: decision nodes and one or more optional utility, also known as value, node(s). If the influence diagram contains a utility node then it is said to be oriented. These nodes are adjoined to the Bayesian net in order to add two concepts to the probabilistic underpinnings of the Bayesian network. The first concept is the differentiation between the information which is available as input to making a decision and distinct from the input to chance nodes which has a conditioning effect on their PMF. The second concept is that of value which results from the making of a decision. This value may be calculated by the utility node(s). That is, decision nodes represent various actions that can be undertaken based on the evidence that is available to assist in making the decision. The utility node computes the value which results when one of several mutually exclusive decisions is made. Non-mutually exclusive decisions may be represented by distinct nodes. The intent is to maximize the expected utility which results from choosing the best possible decision(s) based on the uncertainty of the knowledge that is available at the time the decision must be made.

Influence Diagrams and Goal Lattices

The platform sensor manager should interpret the situation within the context of the mission goals. Particular aspects of the situation may not be as important as others at a particular time. For example, if the mission goal is focused completely on self-preservation, the situation information regarding hostile targets approaching a known friendly target is irrelevant, but information regarding a hostile target approaching own-ship is extremely relevant.

To correctly interpret the situation represented by the influence diagram, the mission goals and their fractional apportionment should be considered. A mapping between each mission goal and a set of variables within the influence diagram that characterize the situation in terms of achieving this goal should provide the appropriate context for weighting the situation information. For example, for a mission goal of "protect self," situation variables that characterize the situation regarding own-ship should be included in this set. Situation variables describing threats to another platform belong to a set corresponding to the "protect friendly" goal. Obviously, there can be some overlap between these sets. Along with the sets of situation variables corresponding to mission goals, the changeable fractional apportionment of these topmost goals may be required to properly weigh the situation information before deciding upon a dynamic goal to instantiate. It should be noted that this use of the topmost goal values in determining the value of different aspects of the situation may be entirely independent of their use in the trickledown of the topmost goal values into the relative sensing action values, the dynamic goals, which are used by the information instantiator to compute the EIVR, the value of which is used to temporally rank order the execution of the individual observation requests.

Situation Information Expected Value Network (SIEV-Net)

A new term is now introduced with which to discuss the approach to utilizing situation information in maximizing the flow of valued information into the real-time model of the world and that neologism is situation information expected value network (SIEV-Net). This term is introduced to differentiate the construct presented here from both Bayesian networks and influence diagrams and to emphasize the fact that situation information, particularly "goal valued" situation information is of primarily interested.

The SIEV-Net, as applied to the sensor management problem, is a particular type of influence diagram in which the utility of a decision is determined by the expected information gain in terms of the Kullback-Leibler divergence and the mission value of that information. The information gain may be due to the change in entropy of only the chance nodes representing the situation assessment rather than just the single node for which more accurate evidence has been acquired as in the case of an influence diagram. The mission value of each situation chance node may be taken from the topmost values of the associated mission goal lattice.

Note two properties of a dynamic situation assessment environment: (1) information is continually being lost due to the fact that the environment is represented by a set of non-stationary, dynamic random variables, and (2) the value of information may be non-stationary and may depend both on the current situation assessment and the changing mission goals.

Each variable should be regularly measured (or inferred) if the total uncertainty is to remain stable about an acceptable operating point. Of particular interested is the problem where there are constraints on information gathering [1] such that stability cannot be maintained and a decision must be made as to what information to acquire, or, more precisely, what valued situation information to acquire. A system design goal of the sensor manager system should be to minimize uncertainty in the situation assessment subject to the constraint of maximizing the acquisition of valued information in the context of the available sensor functions.

The normal method of computing utility in an influence diagram is to evaluate a change in probability in terms of its effects on the monetary value of some other random variable. The optimal decision is the one which maximizes this expected monetary value (EMV). In some cases, this methodology is utilized to assign an "information value" to the result of each decision. That is, if one obtains a certain reduction in the uncertainty about a random variable, how does that change the EMV? While this may be a useful measure in some circumstances, it does not have the meaning of information gain in terms of total reduction in uncertainty about a situation, whether a value is added or not. The value of the information and the quantity of information may not be equated [10].

A different use and measure of information and its interaction with the decision nodes is now disclosed. Evaluate the total change in uncertainty as measured by the sum of the changes in logs of the entropies of the individual chance nodes which would result if an information request were to be instantiated and call this information gain. This is more than the amount of information that would be gained by noting only the change in entropy of the single evidence that is acquired. It takes into account the effect of this evidence on all the other conditional chance nodes in reducing their uncertainty. Previously, it has been mentioned that each situation chance node has associated with it a value of one or more of the topmost goals [2] to which it contributes. The entropy change for each chance node may be weighted by this value giving valued entropy change or valued information. The expectation is taken of this by applying the probability of each mutually exclusive alternative in a chance node that could occur if we were to obtain the requested information.

Given an influence diagram with chance nodes, decision nodes, and value nodes, a SIEV Net may be formed by first partitioning the chance nodes into three sets. The first set, unmanaged chance nodes, can represent random variables for which something is known, although there may not be a way to directly control their value. Unmanaged chance nodes are causally related to the next set, situation chance nodes. The second set, situation chance nodes, are random variables that represent hypotheses regarding a situation about which there is a desire to decrease our uncertainty and which are causally related to the previous unmanaged nodes as well as the following, managed nodes. Managed chance nodes are random variables that are observable, and for which it is possible to exert control over the observation process. That is, a system manager can "manage" these managed chance nodes. These were previously referred to as dynamic goals or information requests. To determine the dynamic goal that will result in the most gain in situation information, one can use the following:

| | |
|---|---|
| C | the set of chance nodes |
| $C_N^k \in C_N \subset C$ | chance nodes which are non-managed |

-continued

| | |
|---|---|
| $C_S^t \in C_S \subset C$ | chance nodes which represent the situation RVs |
| $C_M^m \in C_M \subset C$ | chance nodes which are managed, i.e., dynamic goals |
| D | the decision node |
| $D_i$ | a dynamic goal which is a mutually exclusive option within D |
| $G_s$ | a goal value associated with a situation chance node |
| $G_t$ | the set of topmost goal value from the mission non-stationary goal lattice |
| $R: G_t \times C_S \to G_s$ | the surjective but not necesarily injective mapping of topmost goal values to situation chance nodes |
| $D(^{-i}C_S^l \| ^{+i}C_S^l)$ | Kullback - Leibler distance between the conditional density prior (−) to an information request and after (+) |
| $I_v^t = D(^{-i}C_S^l \| ^{+i}C_S^l) * G_s^t$ | valued information associated with the l situation chance node in response to the decision i |
| $I_v^i = \sum_l I_v^t(i)$ | total valued information gained from decision i |

With the algorithm for selecting first information request to launch being, $$\forall D_i \text{ compute}$$

$$I_v^i$$

and select dynamic goal to launch which yields the maximum situation information expected value.

Figure 7:
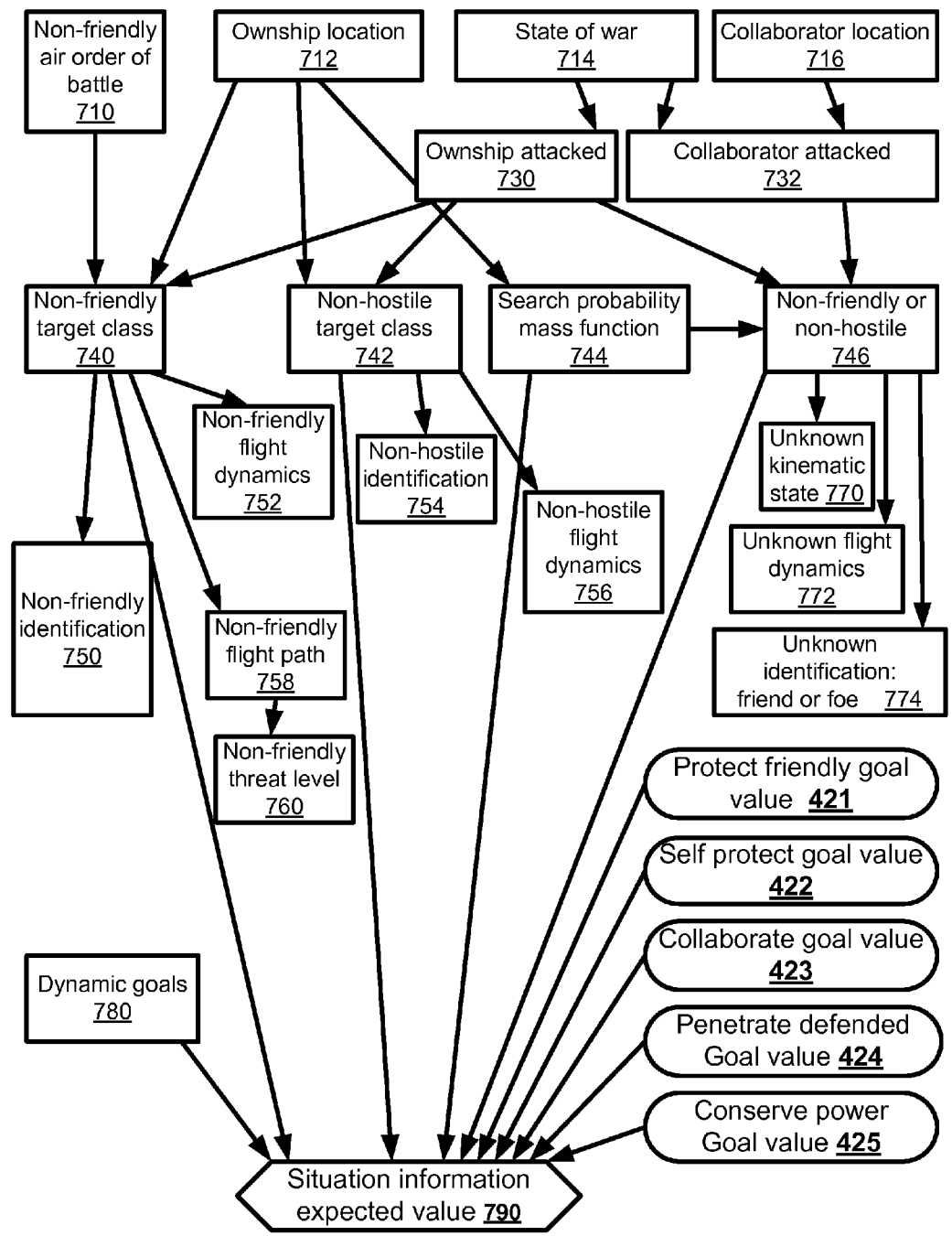
FIG. 7 is a diagram of a notional situation information valued network based on influence diagrams for a forward air defense scenario as per an aspect of an embodiment of the present invention.

As an example, consider a goal lattice, FIG. 5, containing topmost goals of "protect self," "protect friendlies," "penetrate defended areas," and "collaborate," with a corresponding fractional apportionment summing to 1 whose value is associated with the topmost goal of "accomplish mission." Also, consider a SIEV-Net, FIG. 7, with non-managed chance nodes in the top two rows, with situation chance nodes in the middle row, and managed chance nodes below that.

Gs={protect_friendly_gv, collaborate_gv, self_protect_gv, conserve_power_gv, penetrate_defended_gv}

CN={NM_ownship_location, NM_state_of_war, NM_ownship_attacked, NM_nf_class_aob, NM_collaborator_location, NM_collaborator_attacked}

CS={Hyp_search_pmf, Hyp_nf_i_target_class, Hyp_nh_k_target_class, Hyp_nf_or_nh}

CM={M_nf_i_jem, M_nf_i_flight_dynamics, M_nf_i_flightpath, M_nh_k_jem, M_nf_k_flight_dynamics, M_unk_kinematic_state, M_unk_iff, M_nf_i_threat_level}

D={active normal track, passive normal track, active fire control track, passive fire control track, jem, active search, passive search, . . . }

The following relation may be used to associate the situation (hypothesis) variables with the topmost goals:

$$R = \begin{Bmatrix} (\text{protect\_friendly\_gv}, & \text{Hyp\_search\_pmf}), \\ (\text{self\_protect\_gv}, & \text{Hyp\_nf\_i\_target\_class}), \\ (\text{collaborate\_gv}, & \text{Hyp\_nh\_k\_target\_class}), \\ (\text{self\_protect\_gv}, & \text{Hyp\_nf\_or\_nh}), \ldots \end{Bmatrix}$$

When the platform sensor manager is ready to issue an information request, it may evaluate the expected valued situation information which would result from instantiating each dynamic goal (information request). This should provide a measure of the uncertainty reducing capacity of each dynamic goal on each hypothesis variable. Since each hypothesis variable is contained in at least one set corresponding to each mission goal, the fractional apportionment of each goal may be used to weight the situation information from each hypothesis variable. In this case, all hypothesis variables concerning own-ship should be in one set, and the fractional apportionment of "protect self" may be used to weight the situation information of the hypothesis variables in this set. In the case where a hypothesis variable is contained in more than one set, the weighting factors may be summed. After the situation information from each hypothesis variable is computed, and properly weighted as to its contribution to the mission goals, they can be summed. This process may be repeated for all dynamic goals. The results may then be compared to determine which dynamic goal will most reduce the uncertainty of the situation and contribute most to the mission goals. This method accounts for both the dynamic nature of the situation and the mission goals and selects the "most valued" information to obtain in terms of decrease in uncertainty about the situation and the value of the hypotheses whose uncertainties are reduced.

Subsequent Information Requests

Since information requests and their subsequent satisfaction may be asynchronous events, the PSM can continue to launch subsequent information requests by repeating the same computation with the assumption that the information expected to be gained from all previous information requests had, in fact, actually been obtained.

Note that this methodology may select what information to next seek in order to reduce the valued uncertainty of the perceived situation, however it may not actually direct the sensor to make an observation. This information request may be subsequently processed by the Information Instantiator [11] to select from the applicable function table (AFT) that measurement function which maximizes the expected information value rate (EIVR) [4]. The EIVR is the product of the goal value of the dynamic goal multiplied by the amount of information which is expected to be obtained by that sensor action multiplied by the probability of obtaining that information based on sensor characteristics and target state, with this product divided by the time required to obtain that information.

Description of Several Embodiments

One embodiment of the present invention may be embodied in a tangible computer readable medium containing a computer program that when executed by one or more processors, causes the one or more processors to perform a method for generating information requests. The method may include computing at least two possible predicted weighted information gains for at least one situation node in a probabilistic network. The probabilistic network may include at least one situation node and non-situation nodes. Non-situation node(s) may include managed evidence node(s). Situation node(s) may include situation evidence node(s) and may have an associated weight(s). The method may also include issuing an information request to update the at least one non-situation node associated with the greatest predicted weighted information gain. Subsequent information requests may be issued Predicted weighted information gains may include an information gain that is calculated based on changes in entropy or some other parameter describing the uncertainty associated with a random variable. Weighted means that there may be a weight applied to the information gain of a random variable. A weight may be a numerical multiplier representing the relative value of one item over another as in the relative importance of the type of information gained about one random variable relative to that obtained in another random variable.

Weights may be derived from many sources including a goal lattice. An example of a goal lattice is disclosed in US Patent, K. Hintz & G. McIntyre, "Method and Apparatus of Measuring a Relative Utility for Each of Several Different Tasks Based on Identified System Goals," U.S. Pat. No. 6,907,304, Jun. 14, 2005.

At least one of the predicted weighted information gains may be computed based on an entropy change. Similarly, at least one of the predicted weighted information gains may be computed using a Kullback-Leibler divergence. The predicted weighted information gains may be re-computed in the probabilistic network if data for at least one non-situation node changes. Re-computing the predicted weighted information gains in the probabilistic network may be made using the assumption that a previous request had been fulfilled.

A probabilistic network may include a graph of directed arcs connecting nodes wherein the nodes represent parameters of a random variable. An example of a probabilistic network is a Bayesian Network based on Bayes Theorem. Probabilistic networks may also be represented as an influence diagram. Influence diagrams may be an extension of Bayes Networks which includes decision and utility nodes.

In some embodiments, the term information may be a measure of the change in uncertainty about something. Examples of various measures include Shannon information, Fisher's information, Kullback-Leibler divergence, etc.

Embodiments may further include returning the result of a sensing action in response to the information request. A sensing action may include the act of a sensor making an observation of a physical parameter in a physical environment or the act of searching through a database, or the act of obtaining data from a network, etc. A sensor generally has a means for making an observation on a real or artificial environment.

It may be useful in some embodiment to measuring a random variable value related to a non-situation node with a sensor. A random variable value may be a particular value whose value was determined using a technique with some random (or pseudo-random) characteristic. Entropy may include a measure of the uncertainty in a random variable. Random variable value(s) related to a non-situation node may be refined with subsequent measurement(s).

Some embodiments may be implemented using subcomponents. Subcomponents may include software subcomponents, hardware, or hardware that further includes processing capabilities in combination with instructions. The instructions may be software, firmware, or the like. Examples of some subcomponents may include possible predicted weighted information gains processing module, an information request issuer, a sensing action receiver, a random variable value refiner, and a predicted weighted information gain processor.

A possible predicted weighted information gains processing module may be a subcomponent configured to compute the information gain of affected random variables, to multiply each of them by a weight, or to sum the weighted information gains to compute the net gain in weighted information. An information request issuer may be a subcomponent configured to convert an information request into an observation request and to associate with that observation request a value used to determine by some method the next observation to request from the rest of a sensor system to enhance the sensor manager's estimate of the state of the environment. A sensing action receiver may be a subcomponent configured to receive the results of a sensor's observations which may include a means for combining multiple observations and previous measurements to make an estimate of the current state of a random variable. A random variable value refiner may be a subcomponent configured to improve the quality of state estimate of a random variable by combining repeated observations and/or previous measurements or state estimates of the random variable. Examples of refiners are Kalman state estimators, low pass filters, averagers, etc. A predicted weighted information gain processor may be a subcomponent configured to compute the information gain for each random variable and multiplies that by its weight.

Figure 4:
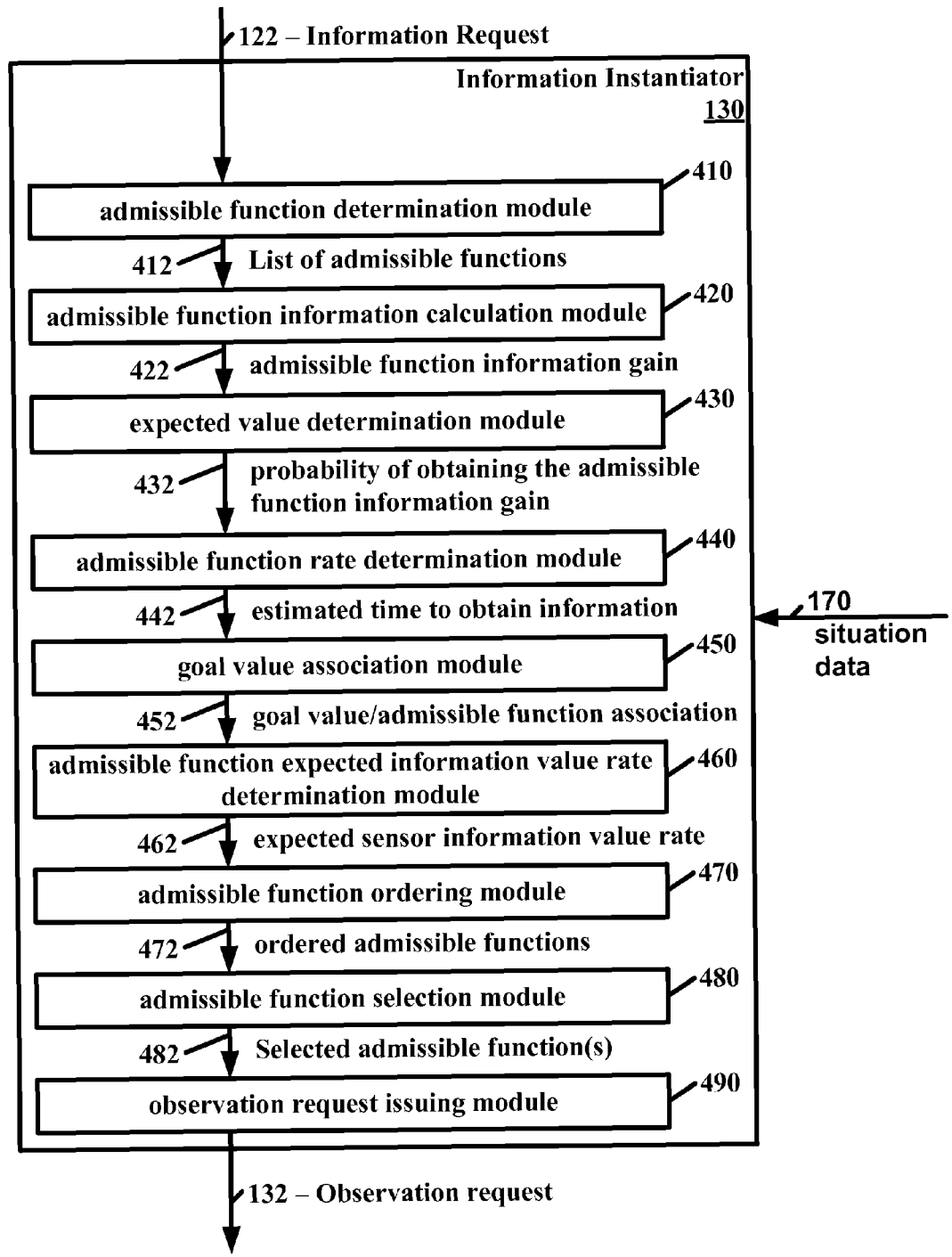
FIG. 4 is a diagram of an Information Instantiator as per an aspect of an embodiment of the present invention.

FIGS. 1 through 4 are illustrated to help explain various aspects of possible embodiments of the invention. FIG. 1 is a diagram showing the partial data flow in and around a Sensor Management System 110. FIG. 2 is a similar diagram to FIG. 1, except that it shows one of the many ways that the situation data 170 may enter the situation information expected value network 120. FIG. 3 expands upon an embodiments of the situation Information Expected Value Network 120. FIG. 4 is a diagram of an Information Instantiator as per an aspect of an embodiment of the present invention.

As illustrated, this embodiment of the sensor manager 110 is configured to receive situation data 170 and generate an observation request 132. The observation request may be fed to sensor(s) 140 that can receive sensor actions and generate sensor track data 142 that may be processed by track fusion 150 and made available to situation awareness database 160.

Situation data should describes the sensor system and may include at least one of the following: a goal lattice structure data; a goal lattice value; a kinematic state estimate; a non-kinematic state estimate; a search probability mass function; a sensor applicable function table; or any combination of the above. The situation data 170 may originate from any number of sources such as a situation awareness database 160. A situation awareness database 160 may include a table of admissible functions. This table should associate a list of sensor functions with sensors and the information they are configured to collect.

The platform sensor manager 110 includes a situation information expected value network 120 and an information instantiator 130. The situation information expected value network 120 is configured to generate an information request 122 that may then be processed by the information instantiator 130 to generate the observation request 132.

FIG. 3 expands the situation information expected value network 120 to illustrate the use of a probabilistic network 324 configured to generate situation probabilities 326 using situation data 170. The probabilistic network may include: at least one managed evidence node; at least one unmanaged evidence node; and at least one situation evidence node. The expected information gain determination module 328 may then generate an information request 122 using expected changes in the situation probabilities 326.

The information instantiator 130 is configured to generate a sensor observation request 132 utilizing the information request 122 and the situation data 170. As illustrated in FIG. 4, an embodiment of the information instantiator 130 includes: an admissible function determination module 410; an admissible function information calculation module 420; an expected value determination module 430; an admissible function rate determination module 440; a goal value association module 450; an admissible function expected information value rate determination module 460; an admissible function ordering module 470; an admissible function selection module 480; and an observation request issuing module 490. The admissible function determination module 410 is preferably configured to use the information request 122 and the situation data 170 to select admissible functions from the set of applicable functions, where the list of selected admissible functions 412 include applicable functions capable of fulfilling the information request 122. The admissible function information calculation module 420 is preferably configured to determine admissible function information gain 422 for at least one of the admissible functions 412 utilizing situation data 170. The expected value determination module 430 is preferably configured to determine the probability of obtaining the information gain 432 associated with at least one of the admissible functions 412. The admissible function rate determination module 440 is preferably configured to estimate the time required to obtain the information 442 associated with at least one of the admissible functions 412. The goal value association module 450 is preferably configured to associate a goal value 452 with at least one of the admissible functions 412. The admissible function expected information value rate determination module 460 is preferably configured to compute a product by multiplying the admissible function information gain with the probability of obtaining the admissible function information gain and the goal value of the admissible function information gain and then compute the expected information value rate 462 of at least one admissible function 412 by dividing the product by a time necessary to obtain the expected sensor information value rate 462. The admissible function ordering module 470 is preferably configured to generate ordered admissible functions 472 by ordering the admissible functions 412 based on their expected sensor information value rate 462. The admissible function selection module 480 is preferably configured to select an admissible function 412 from the ordered admissible functions 472 to produce a selected admissible function 482. The observation request issuing module 490 is preferably configured to issue an observation request 132 to a sensor associated with the selected admissible function 482. In some embodiments, the value of the expected sensor information value rate 462 may be included in the sensor observation request 132.

Figure 5:
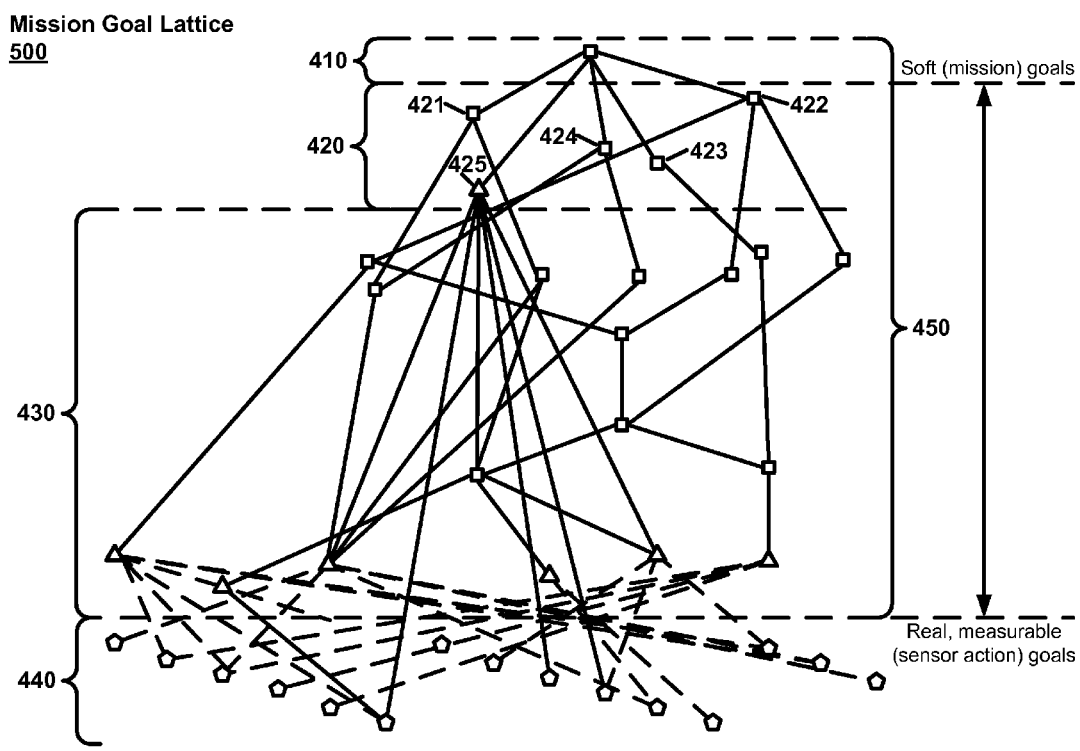
FIG. 5 is a diagram showing a notional goal lattice for forward air defense mission as per an aspect of an embodiment of the present invention.

FIG. 5 is a diagram showing a notional goal lattice for forward air defense mission as per an aspect of an embodiment of the present invention. The goal lattice links goals functionally. The lattice may be broken into several goal groups that range from soft abstract goals 410 to real measurable goals 440. The upper part of the diagram includes Group 410 includes high level soft (mission) goals. Group 420 includes goals that directly precede and support the Group 410 high level soft (mission) goals. Group 430 are intermediate goals that support the group 420 goals.

Figure 6:
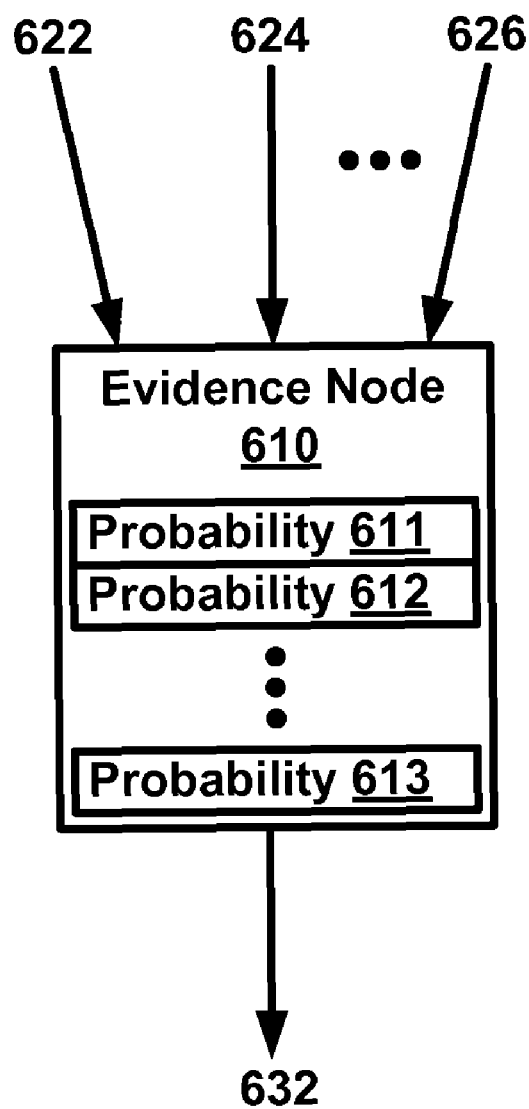
FIG. 6 is a diagram of an evidence node as per an aspect of an embodiment of the present invention.

FIG. 6 is a diagram of an evidence node as per an aspect of an embodiment of the present invention. An evidence node is preferably configured to receive various influences and/or conditions 622 and 624 through 626 and apply them to a set of probabilities 611 and 612 through 613 to generate an output 632. The nodes may be linked to create a notional valued situation information network. FIG. 7 is an example of such a notional valued situation information network based on influence diagrams for a forward air defense scenario as per an aspect of an embodiment of the present invention. This diagram shows a multitude of nodes 710 through 780, a multitude of mission goals 421 through 425 and dynamic goals may be connected to generate a situation information expected values 790. One can note how the series of high level nodes 710, 712, 714 and 716 are interconnected through a multitude of intermediate nodes 730 through 774. This example, shows how various aspects of an air defense can interrelate. For example several of the nodes are concerned with whether targets are hostile or friendly, identifiable or not, in a friendly flight path or not, etc. Also, shown in this example, are the group 420 goal values from FIG. 5.

Figure 8:
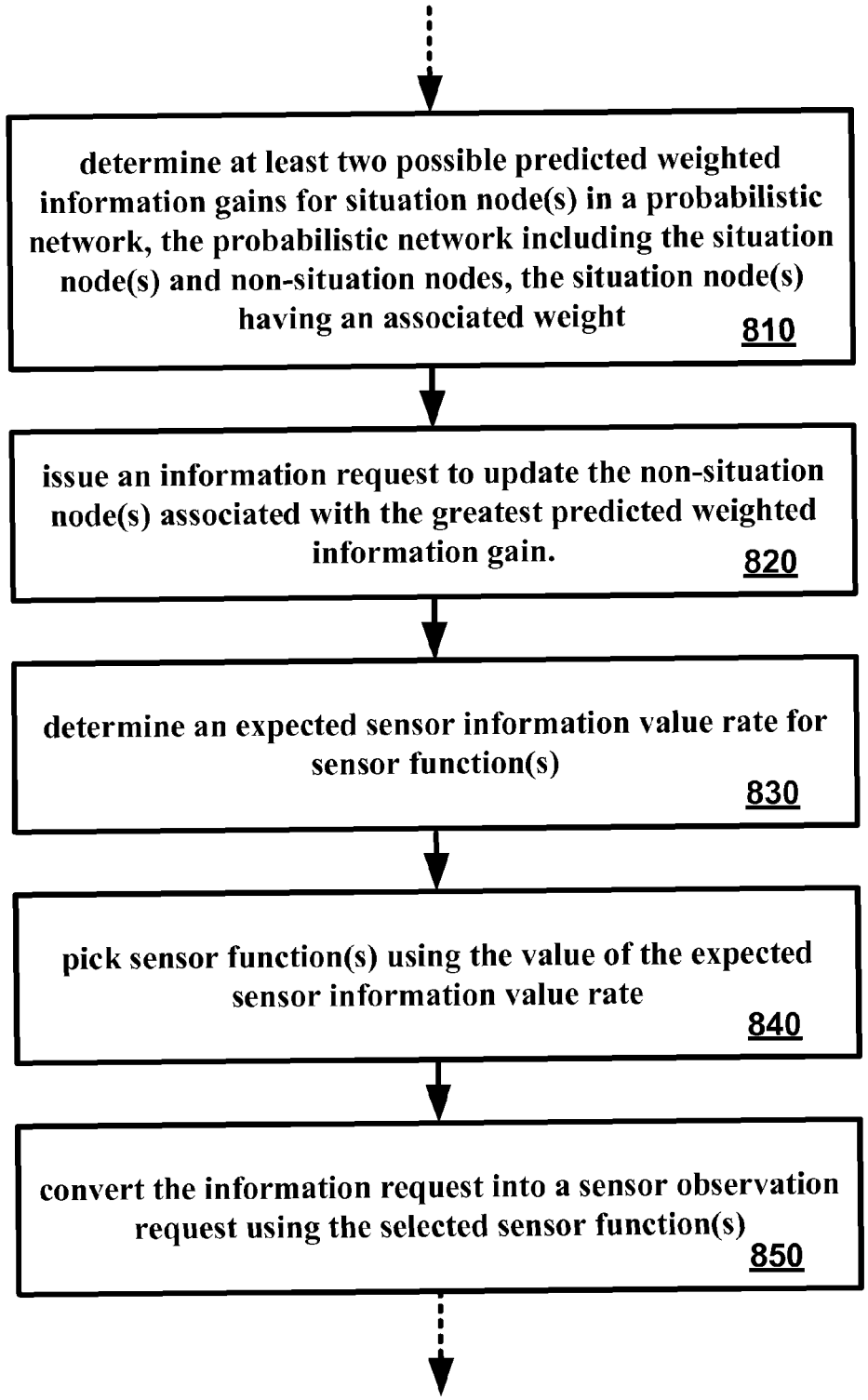
FIG. 8 is a flow diagram of an aspect of an embodiment of the present invention.

FIG. 8 is a flow diagram of an aspect of an embodiment of the present invention. This flow diagram and reasonable equivalents thereof may be implemented in a tangible computer readable medium containing a computer program that when executed by one or more processors, causes the one or more processors to perform a method for generating a sensor observation request to at least one of a multitude of sensor functions in a sensor system. The tangible computer readable medium could include magnetic or optical disk(s), solid state memory or other medium capable of maintaining storing data. The processors may be embodied in a PC or specialized hardware. It is envisioned that embodiments of the present invention will run on both generic personal computers and in specialized hardware with embedded systems designed to conform to specific applications such as aircraft, boats, and secure sites.

The method includes determining at least two possible predicted weighted information gains for at least one situation node in a probabilistic network (at 810) The probabilistic network may be a Bayesian network, an influence diagram, a network based on the Dempster-Shafer theory of evidence based upon belief function(s) and plausible reasons, or the like. The probabilistic network should include the situation node(s) and non-situation nodes with the situation node(s) having an associated weight. The associated weight may be derived from a goal lattice or the like. At 820, an information request may be issued to update the non-situation node(s) associated with a selected predicted weighted situation information gain. The predicted weighted situation information gains may be determined many ways including but not limited to using a change in entropy value, using Kullback-Leibler divergence, or the like. In some embodiments the predicted weighted situation information gain may be selected based on factors such as maximum value, average value, or other calculable value.

An expected sensor information value rate may be determined for at least one of the sensor functions of the multitude of sensor functions at 830. At 840, a selected sensor function may be picked from the multitude of sensor functions using the value of the expected sensor information value rate. The information request may then be converted into the sensor observation request using the selected sensor function at 850. The expected sensor information value rate may be included in the sensor observation request.

Figure 9:
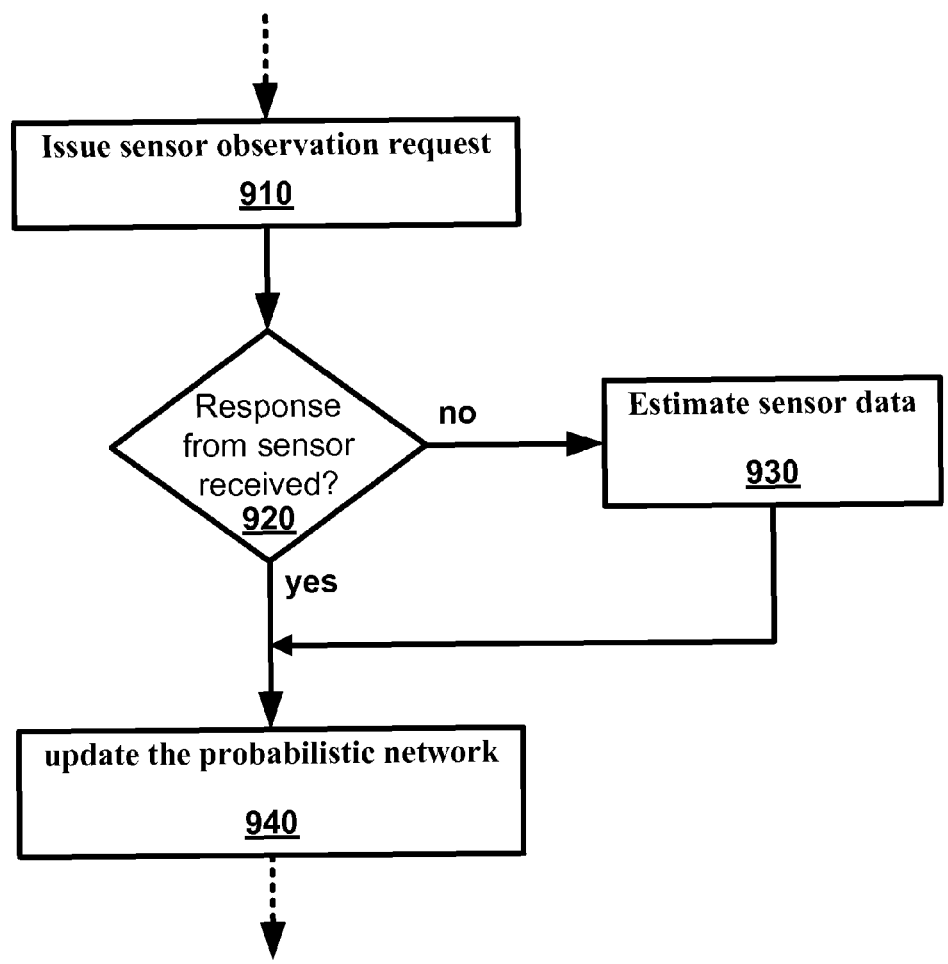
FIG. 9 is a flow diagram of another aspect of an embodiment of the present invention.

FIG. 9 is a flow diagram of another aspect of an embodiment of the present invention. In this embodiment, the sensor observation request is issued at 910. The sensor observation request is preferably configured to urge data from one sensor or more assigned sensors. The system can include a test function to determine if the sensor data was received at 920. Preferably, this test will include a condition that the sensor data is received within a time frame acceptable to the update rate of the system. In that case that the data was received, the probabilistic network may be updated using sensor data returned in response to the sensor observation request at 940. In the situation that the sensor data was not received, the system can estimate the sensor data at 930 before progressing to update the probabilistic network at 940

REFERENCES

The following references are included to provided further support and understanding to embodiments of the invention. Several of these references are references throughout the disclosure in square brackets.

[1] K. J. Hintz and E. S. McVey, "Multi-Process Constrained Estimation," *IEEE Transaction on Systems, Man, and Cybernetics*, vol. 21, no. 1, pp. 434-442, January/February 1991.

[2] K. J. Hintz, and G. McIntyre, "Goal Lattices for Sensor Management," Proceedings Signal Processing, Sensor Fusion, and Target Recognition VIII, Ivan Kadar; Ed., Proc. Ivan Kadar; Ed., Proc. Vol. 3720, pp. 249-255, Orlando, Fla., April, 1999.

[3] G. A. McIntyre, "A Comprehensive Approach to Sensor Management and Scheduling", Ph.D. Dissertation, Fall 1998, George Mason University, Fairfax, Va.

[4] K. J. Hintz and J. Malachowski, "Dynamic goal instantiation in goal lattices for sensor management," Signal Processing, Sensor Fusion, and Target Recognition XIV; Ivan Kadar; Ed., Proc. SPIE Vol. 5809, pp. 93-99, Orlando, Fla., April 2005.

[5] E. Waltz and J. Llinas, *Multisensor Data Fusion*, Artech House, 1990.

[6] K. J. Hintz, "A Measure of the Information Gain Attributable to Cueing", *IEEE Trans. on Systems, Man, and Cybernetics*, vol. 21, no. 2, pp. 434-442, March/April 1991.

[7] F. Jensen, "An Introduction to Bayesian Networks," Springer Verlag, 1996.

[8] E. Charnaik, "Bayesian Networks without Tears," *AI Magazine*, pp. 50-63, Winter 1991.

[9] R. D. Shachter, "Evaluating Influence Diagrams," *Operations Research*, v. 34, no. 6, pp. 871-882, November/December 1986.

[10] T. B. Sheridan, "Reflections on Information and Information Value," *IEEE Trans. SMC*, v. 25, no. 1, pp. 194-96, January 1995.

[11] K. J. Hintz, and G. McIntyre, "Information Instantiation in Sensor Management," Proceedings Signal Processing, Sensor Fusion, and Target Recognition VII, Ivan Kadar; Ed., Proc. Vol. 3374, pp. 38-47, Orlando, Fla., April, 1998.

CONCLUSIONS

The concept of situation information is disclosed as an element that may be implemented, for example, in existing information-theoretic sensor management systems. It should allow the PSM to perform tradeoffs in terms of information gain with respect to the situation in a similar manner as was done with kinematic, search, and ID information. Weighting the situation information based on the fractional apportionment of the top most goals yields an appropriate measure that may be used to determine the most important information needed at a given instant, as well as determining which information request to instantiate as a dynamic goal. The uncertainties contained within the SIEV-Net are functions of time and increase between updates, so utilizing methods similar to dynamic Bayesian network constructs should help model this. Also, the zero order Markov approach to situation information gain computation may be extended to allow for determining a temporal sequence of dynamic goal instantiations that may maximize the situation information over a particular time interval.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above described exemplary embodiments. In particular, it should be noted that, for example purposes, the above explanation has focused on the example(s) of a sensor manager for a forward air defense mission of a military aircraft. However, one skilled in the art will recognize that embodiments of the invention could be used to control the sensors in a distributed network such as the Bay Area Rapid Transit System (BART) or Washington DC Metro subway system, control the environmental sensor systems in a complex mechanical system such as a helicopter, control the sensors used to manage a computer communications network as well as manage the routing of network traffic, or control any system which has a multiplicity of sensors for establishing the state of the system and possibly using the estimate of that state to control the system.

In addition, it should be understood that any figures which highlight the functionality and advantages, are presented for example purposes only. The disclosed architecture is sufficiently flexible and configurable, such that it may be utilized in ways other than that shown. For example, the steps listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112, paragraph 6. Claims that do not expressly include the phrase "means for" or "step for" are not to be interpreted under 35 U.S.C. 112, paragraph 6.

What is claimed is:

1. A tangible computer readable medium containing a computer program that when executed by one or more processors, causes the one or more processors to perform a method for generating a sensor observation request to at least one of a multitude of sensor functions in a sensor system, the method comprising:
   a) determining at least two possible predicted weighted information gains for at least one situation node in a probabilistic network, the probabilistic network including the at least one situation node and non-situation nodes, the at least one situation node having an associated weight;
   b) issuing an information request to update the at least one non-situation node associated with a selected predicted weighted situation information gain;
   c) determining an expected sensor information value rate for at least one of the sensor functions of the multitude of sensor functions;
   d) picking a selected sensor function from the multitude of sensor functions using the value of the expected sensor information value rate;
   e) converting the information request into the sensor observation request using the selected sensor function; and
   f) updating the predicted weighted situation information gains in the probabilistic network using predicted sensor data in response to the sensor observation request.

2. A method according to claim 1, further including updating the probabilistic network using sensor data returned in response to the sensor observation request.

3. A method according to claim 1, wherein the probabilistic network is a Bayesian network.

4. A method according to claim 1, wherein the probabilistic network is an influence diagram.

5. A method according to claim 1, further including deriving the associated weight from a goal lattice.

6. A method according to claim 1, wherein at least one of the predicted weighted situation information gains is determined using a change in entropy value.

7. A method according to claim 1, wherein at least one of the predicted weighted situation information gains is determined using Kullback-Leibler divergence.

8. A method according to claim 1, wherein the sensor observation request is assigned to at least one sensor.

9. A method according to claim 1, wherein the sensor observation request urges data from at least one sensor.

10. A method according to claim 1, wherein the value of the expected sensor information value rate is included in the sensor observation request.

11. A computer implemented sensor manager comprising:
 a) a situation information expected value network including:
  i) a probabilistic network configured to generate situation probabilities using situation data; and
  ii) an expected information gain determination module configured to generate an information request using expected changes in the situation probabilities;
 b) an information instantiation processor configured to generate a sensor observation request utilizing the information request and the situation data; and
 c) a sensing action receiving processor configured to receive the result of a sensing action.

12. A sensor manager according to claim 11, wherein the probabilistic network is an evidential reasoning network.

13. A sensor manager according to claim 11, wherein the probabilistic network is a Bayesian network.

14. A sensor manager according to claim 11, wherein the probabilistic network is an influence diagram.

15. A sensor manager according to claim 11, wherein the situation data includes at least one of the following:
 a) a goal lattice structure data;
 b) a goal lattice value;
 c) a kinematic state estimate;
 d) a non-kinematic state estimate;
 e) a search probability mass function;
 f) a sensor applicable function table; or
 g) any combination of the above.

16. A sensor manager according to claim 11, wherein the probabilistic network includes:
 a) at least one managed evidence node;
 b) at least one unmanaged evidence node; and
 c) at least one situation evidence node.

17. A sensor manager according to claim 11, wherein the information instantiation processor includes:
 a) an admissible function determination module configured to use the information request and the situation data to select admissible functions from the set of applicable functions, the admissible functions including the applicable functions capable of fulfilling the information request;
 b) an admissible function information calculation module configured to determine admissible function information gain for at least one of the admissible functions utilizing situation data;
 c) an expected value determination module configured to determine the probability of obtaining the information gain associated with at least one of the admissible functions;
 d) an admissible function rate determination module configured to estimate the time required to obtain the information associated with at least one of the admissible functions;
 e) a goal value association module configured to associate a goal value with at least one of the admissible functions;
 f) an admissible function expected information value rate determination module configured to:
  i) compute a product by multiplying:
   (1) the admissible function information gain;
   (2) the probability of obtaining the admissible function information gain; and
   (3) the goal value of the admissible function information gain; and
  ii) compute the expected information value rate of at least one admissible function by dividing the product by a time to obtain the expected sensor information value rate;
 g) an admissible function ordering module configured to order the admissible functions by their expected sensor information value rate;
 h) an admissible function selection module configured to select an admissible function from the ordered admissible functions; and
 i) an observation request issuing module configured to issue an observation request to a sensor associated with the selected admissible function.

18. The information request generator according to claim 11, wherein the value of the expected sensor information value rate is included in the sensor observation request.

* * * * *